Sept. 4, 1934.    D. S. HULFISH    1,972,266
MOTOR CONTROL
Filed Feb. 27, 1932

INVENTOR
DAVID S. HULFISH
BY
ATTORNEY

Patented Sept. 4, 1934

1,972,266

UNITED STATES PATENT OFFICE 1,972,266

MOTOR CONTROL

David S. Hulfish, Chicago, Ill., assignor to Teletype Corporation, Chicago, Ill., a corporation of Delaware Application February 27, 1932, Serial No. 595,503

11 Claims. (Cl. 178—4.1)

This invention relates to systems and apparatus for operating telegraph machines and more particularly to telegraph systems and apparatus for controlling remotely the operation of driving motors of such machines.

The system of the present invention is particularly adapted for isolated lines which are not associated with switchboards or equivalent switching equipment. In such isolated lines the control of the motors for starting and stopping cannot be exercised automatically by the connection or disconnection of the line at a switching point and the control, therefore, must be exercised arbitrarily and voluntarily by the persons operating the system.

The object of this invention, therefore, is to provide a system of motor control devices, auxiliary to the apparatus for the transmission of intelligence, such that an arbitrary action on the part of an operator at one station may result in the control of motors at all stations.

A further object is to provide a system wherein the control of the motors may be effected primarily by the apparatus normally provided for the transmission of intelligence, whereby the apparatus necessary for purposes of motor control is kept a minimum.

A further object of this invention is to provide a telegraph system so arranged that it may be left unattended by removing all power or signalling current from the system without producing any adverse or undesired effect upon the motor control system or upon the motors controlled thereby.

The objects of the present invention are attained by providing electrical contacts and relays, the contacts being operated by the normal telegraphic transmission apparatus to control the relays which in turn control the starting and stopping of the driving motors. The contacts are operated in predetermined order by the transmission of determined intelligence signals which are not recorded on the printing telegraph receiver. This results in stopping the motor with the line closed and with the normal current of an idle line. The interconnection of relays is such that the current in the line may be discontinued to produce a change in the condition of the controlling relays but not to start the motors. Subsequently the current in the line may be reestablished to produce a further change in the condition of the relays which will start the motors and which will return the control elements to normal idle condition. A stopped motor may be restarted by a momentary interruption followed by reclosing of the line current or the interruption of the line current may continue for any interval of time.

A clear understanding of the invention may be had from the following description, taken in conjunction with the accompanying drawing, wherein, Fig. 1 shows the printing elements of a well known type of printer or telegraph typewriter with the embodiment of the present invention.

Figure 1:
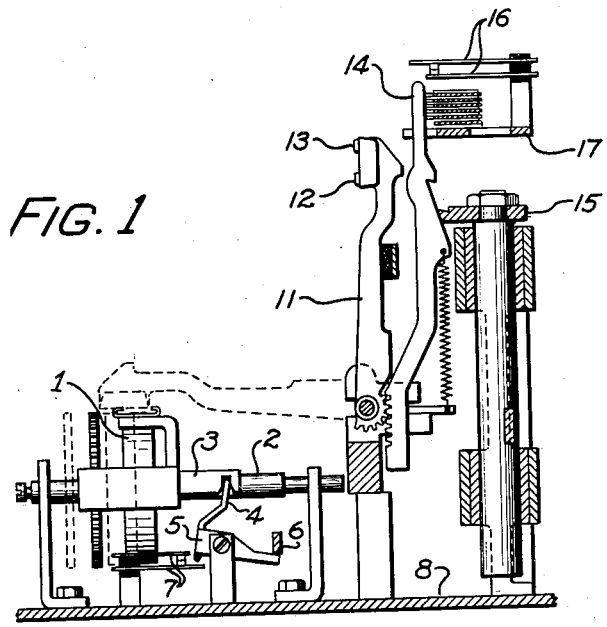

The practice of selection in printing telegraphy is to divide the total number of characters which it is desired to print selectively into two groups of which one group contains the letters and characters more frequently used, and the other group contains the figures and characters less frequenty used. The selection of a character then comprises two successive selections, first the selection of the group, called "case", and then the selection of the character in that case. The selection of the case is recorded by locking the mechanism of the receiving printer in such manner that all subsequent selections will be printed in that case until control is received to change to the alternative case. Letter case carries selection among at least 26 characters, while figure case does not demand so many and, therefore, offers spare selections which are not demanded by figures and special symbols. This invention takes advantage of the condition offering the spare selections and uses one of these selections in the figure case as a selective medium to control the starting and stopping of the driving motor of the telegraph instrument. Thus, by a selective code establishing the figure case followed by a selective code which is idle for printing purposes, in that it is not required to print any record, a selective medium is obtained which is used for controlling the motors. Each of the selections involves a mechanical action in the telegraph printer and to convert the mechanical actions into electrical control for the motors, this invention provides a pair of electrical contacts operated by the case shift mechanism and a pair of electrical contacts operated by the typeprinting mechanism. In the case of the motor control signal both of these contacts will be operated at the same time because in going into the figure case position the figure case contacts are operated to continue during the period that the pointer is in that position after which the character selection will operate the character contacts momentarily. The manner of adding these contacts to the telegraph printer varies with the type of printer to which the motor control system is applied. In Fig. 1 the printer shown is of the type disclosed in the patent to H. L. Krum, No. 1,796,- 378, issued March 17, 1931, and a more detailed explanation of the structure may be had by reference to that patent. For typewheel printers the character contact may be operated by a cam on the typewheel or on its shaft and the case contact may be operated by any mechanical part which occupies one position for one case and another position for another case. The means for operating a character contact in a typewheel printer of the code disc and permutation type is described in the patent to A. F. Dixon No. 1,201,- 809, issued October 17, 1916. In the printer there shown, the case contacts would be operated by the armature 220 of the shift magnet 214.

In the further description the contacts will be referred to as "shift" and "M", the shift contact being the contact which is operated by shifting from letter case to figure case and the M contact being the contact which is operated by the operation which prints the letter M in the letter case but which does not print in the figure case position.

Referring now to Fig. 1, a cylindrical platen 1 is arranged to slide upon a fixed shaft 2 by control of an extension 3 which is articulated with an operating arm 4 of a rocker 5. The rocker 5 is engaged by a member 6 which, in turn, may be operated by the selecting mechanism of the printer in response to the case shift condition or code received over the line wire. A pair of contacts 7 are fixed to the frame 8 of the printer in such manner that when the platen 1 is in the letter case position, as shown, the contacts will be closed and when the platen 1 is in the figure shift position shown dotted the contacts 7 will be open because the rocking member 5 then will occupy its alternative position.

The printing mechanism comprises a plurality of type bars 11 each having a letter type 12, some of which have a figure type in the location 13 but the type bar for the letter M is without a printing type in the location 13.

Each type bar has a pull bar 14 geared to the type bar and operable by a power member 15, whenever the pull bar has been selected in response to a received code which has set the permutation bars. A pair of contacts 16 are mounted upon a frame member 17 in such manner that they will be engaged and opened by the pull bar 14 whenever the type bar 11 is operated.

When printing the letter M the contact 16 will be opened, but the contact 7 will not be open at that time. When printing figures the contact 7 will be opened, but the contact 16 will not be opened. In response to the signals "shift M", the contact 7 will be opened continuously while in the shifted position and the contact 16 will be opened momentarily when the pull bar for the letter M is operated resulting in stopping the motor as will be seen by a study of the circuit connections.

Figure 2:
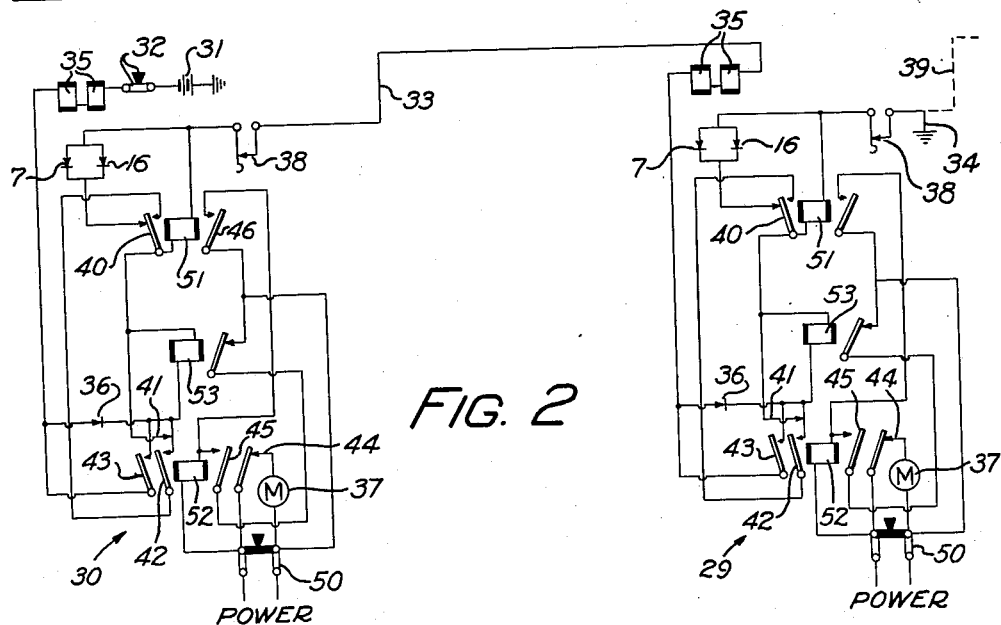
Fig. 2 shows a circuit which embodies the invention in a motor control system of two stations with added stations indicated.

Referring to Fig. 2, the shift contacts 7 and the M contacts 16 are labeled as in Fig. 1. Two stations 29 and 30 are shown which are identical except for the main line power supply. At station 30, the grounded battery 31 supplies power through a main switch 32 and main line 33 to ground at 34, but should it be desired to add stations the ground at 34 is replaced by a further line wire 39 which passes through the added stations to ground which completes the return to the battery 31. At each station the telegraphic printing equipment is represented by the selector magnets 35, a sending transmitter contact 36 and a motor 37. The motor control devices comprise the relays 51, 52 and 53 which operate in the order mentioned and the motor starting key 38. The relay 51 is shunted by its own armature 40 and back contact in series with the parallel contacts 7 and 16. Thus by opening the shift contacts and the M contacts at the same time the shunt may be removed from the relay 51. Relay 53 is shunted by contact 41 of relay 52, and further, upon the operation of relays 51 and 52, the relay 53 is shunted alternatively by armature 40 and the armature 42 and front contacts of the relays 51 and 52. The armature 43 and front contact of the relay 52 are connected to shunt the sending contact 36 while the contact 44 of this relay is connected to start and stop the motor M. A locking circuit for the relay 52 is provided through armature 45 and front contact thereof, relay 52 and contacts of relay 53. The motor and the relay 52 are operated by power received through a switch 50.

Figure 3:
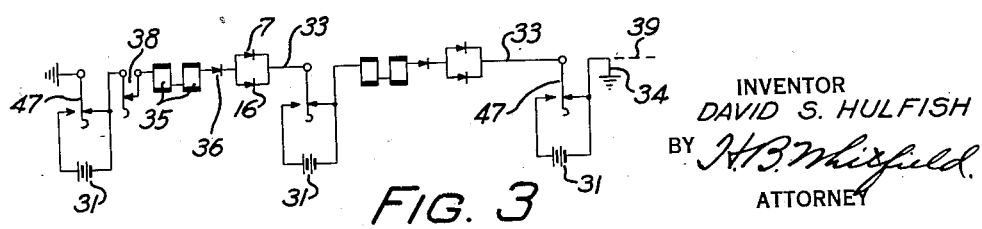
Fig. 3 shows an alternative circuit arrangement.

In the alternative circuit arrangement of Fig. 3, the switch 32 is replaced by locking keys 47 individual to each station and batteries 31 are provided, individual to each station. The key 47 includes the battery 31 in the line 33 or excludes it from the line, as desired.

The operation of the system is as follows:

In condition of non-operation of the system, relays 51, 52, 53 are non-energized and switches 32 and 50 are open. To put the system in condition for operation, switches 32 and 50 are normally closed at each station which establishes a normal line current through battery 31, main switch 32, printer magnets 35, sending contact 36, contacts 41 of relay 52, armature 40 and back contact of relay 51, shift and M contacts 7 and 16, starting switch 38, line wire 33 and similarly through station 29 to ground 34. The closing of switches 50 starts the motors 37 at each station and messages may be sent from either sending contact 36 to both printing magnets 35.

To stop the motors the signals shift and M are sent which open the contacts 7 at both stations during the period of shift condition and the contacts 16 momentarily. During the momentary opening of contacts 7 and 16, the line current from battery 31 flows through relay 51 instead of through its shunt, energizing relay 51 which remains operated by current from battery 31, through transmitter contact 36 relay contacts 41 and winding of relay 51 to line 33. Armature 46 of relay 51 closes an obvious circuit for energizing relay 52, which by opening contacts 44 stops the motor 37. Armature 43 of relay 52 shunts the transmitter contact 36 so that any accidental operation of the transmitter will not disturb the system. Armature 45 of relay 52 closes a holding circuit for relay 52 which may be traced from switch 50 through winding of relay 52, armature 45, contact of relay 53, returning to the other side of switch 50, which will retain relay 52 energized after deenergization of relay 51 as described later. Relay 53 heretofore has been shunted by contact 41 and relay 52 now forms a second shunt by armature 42 in series with front contact and armature 40 of operated relay 51 and immediately relay 52 opens its contact 41 to remove the first shunt of relay 53. By this operation the shunt of relay 53 has been changed without operating the relay 53.

Both of the stations 29 and 30 have performed the operations described. The system will remain in the condition now attained with all motors stopped until a manual operation is performed at any connected station to start all of the motors.

To start the motors the key 38 is operated momentarily. The opening of the key 38 stops the flow of current from battery 31 and deenergizes relay 51 which forms again its shunt through armature 40 and its back contact and contact 16 and relay 51 thereafter cannot be reenergized while contact 7 or 16 is closed. The opening of the armature 40 from its front contact opens the shunt of relay 53 which, however, is not energized because of the absence of line current at this time due to the open key 38. The relay 52 remains energized through its holding circuit as described. Upon the reclosing of the key 38, current from battery 31 flows through armature 43 of relay 52 and winding of relay 53 thence through contacts 40, 16 and 38 to the line. Relay 53 is energized which releases relay 52 by opening its holding circuit and the release of relay 52 places the entire system in its normal operating position, since contacts 44 start the motor 37, contacts 41 shunt the relay 53 and armature 43 removes the shunt from the transmitter contact 36.

When the motors have been stopped by the shift and M signals as described and it is desired to discontinue transmission for the night or for any determined interval, the switch 32 may be opened, effecting exactly the same conditions described for the opening of switch 38. The motor 37 will not be started but should the power switches 50 be opened at the several stations, the relays 52 will be released to close their contacts 44 and then the motors 37 will be restarted when the switches 50 are reclosed and may be stopped by closing the line circuit at switch 32 and sending the signals shift and M which will place the entire system in operating condition with motors stopped.

In Fig. 2 the battery 31 and main switch 32 are supplied at but one station and the cooperation of that station to close switch 32 is required to enable any two stations on the line to operate the telegraphic equipment. In the alternative circuit arrangement shown in Fig. 3 a separate battery 31 and its key is provided for each station, the key 32 taking the form shown at 47 in Fig. 3. The key 47 is a locking key and its operation at any station will include a battery 31 to enable all stations to operate. Such a system may be operated in the following manner:

The system normally is idle, without line current, with all relays 51 shunted and not energized, with all relays 53 unenergized and included in the line circuit, and with all relays 52 energized by current in their individual holding circuits through the armatures and back contacts of their respective relays 53. A station desiring to send a message will insert its battery 31 into the line circuit by reversing its locking key 47 and thus will initiate a period of activity in the line. The battery now included in the line will energize all relays 53, which will open the holding circuits of all relays 52, thus deenergizing all relays 52. Contacts 44 will start all motors 37, armatures 43 will open the shunts of all sending contacts 36, and contacts 41 will shunt all of the relays 53 to remove them from the line circuit. The initiating station then may send messages, then send shift and M signals to stop all motors, then remove the battery from the line by restoring the key 47. Removing the battery 31 from the line will deenergize all relays 51, restoring the line to its idle condition, without line current, as described above.

Although the invention has been described in connection with a specific form thereof, it will be understood that it has further applications and it is not intended to be limited by the embodiment shown for illustration.

The invention claimed is:

1. In a motor control system, a printer, a motor for driving said printer, a pair of electrical contacts in said printer and operated by the shift mechanism of said printer, a pair of electrical contacts in said printer and operated by a character mechanism of said printer, and means to stop said motor controlled by said shift contacts and said character contacts jointly.

2. In a motor control system, a printer, a motor for driving said printer, a pair of electrical contacts in said printer and operated by the shift mechanism of said printer, a pair of electrical contacts in said printer and operated by a character mechanism of said printer, and a motor stop relay responsive to the concurrent operation of said contacts.

3. In a motor control system, a printer, a motor for driving said printer, an electrical contact in said printer and operated by the shift mechanism of said printer, an electrical contact in said printer and operated by a character mechanism of said printer, a signalling line, and a motor-stop relay in said signaling line and shunted by said shift contact and said character contact jointly, whereby the selective operation of said contacts may include said relay in said signaling line to effect the operation of said relay by the line current to stop said motor.

4. In a telegraph system, a printer, a motor for said printer, a line circuit, a motor-starting relay and a motor stopping relay in said line circuit, first contacts for shunting said motor-stopping relay, further contacts for shunting said motor-starting relay, code-responsive mechanical means for operating said first contacts, and further means for operating said further contacts.

5. In a motor control system, a plurality of stations, motor starting relays at each station, a closed line circuit including all of said motor starting relays, sources of current individual to each of said stations, means at each station for including in said line circuit a source of current for operating said relays, and further means whereby the operation of said relays removes said relays from said circuit.

6. In a motor control system, a plurality of stations, motor starting relays at each station, a closed line circuit including all of said motor starting relays, sources of current individual to each of said stations, means at each station for including in said line circuit a source of current for operating said relays, further relays for stopping said motors, and further means whereby said starting relays may be included in the line circuit for operation by said source of current.

7. In a motor control system, a plurality of stations, motors at each station, motor stopping relays at each station, a closed line circuit, and code responsive signal mechanism for including said relays in the line circuit to be operated by the line current whereby said relays operate to stop said motors.

8. In a telegraph system, telegraph sets, motors for driving said telegraph sets, a line circuit, motor-stopping relays, motor starting relays, means responsive to line signals for including said motor stopping relays in said line circuit for operation by line current, means for removing said line current from said line to release said relays, and means operated by said motor stopping relays upon release thereof whereby said motor stopping relays are removed from said line circuit and said motor starting relays are substituted.

9. In a telegraph system, telegraph stations, motors at said stations, motor-stopping relays at said stations, motor starting relays at said stations, a line circuit, means responsive to line signals for including said motor stopping relays in said line circuit for operation by line current, means at all stations for removing said motor stopping relays from said line circuit and substituting said motor starting relays.

10. In a telegraph system, a plurality of telegraph stations, operating motors at said stations, an operating signaling line circuit including telegraphic signaling apparatus at said stations and including a line battery at one of said stations, motor-stopping relays at said stations, and means controlled by said telegraphic signaling apparatus for including said relays in said signaling line circuit for operation by said line battery to stop said motors.

11. In a remote control system, a telegraph transmitter, a telegraph receiver, a line circuit connecting said transmitter and said receiver, a motor for said receiver, a power circuit for said motor, a motor-control relay normally excluded from said line circuit during periods of telegraphic communication, means controlled by said transmitter for operating said relay by current over said line to stop said motor, and further means for restarting said motor prepared for operation by the controlling act of interrupting the current in said line and operated by the resumption of current in said line and also excluded from said line circuit during periods of telegraphic communication.

DAVID S. HULFISH.